(12) United States Patent
Dalakuras et al.

(10) Patent No.: US 6,990,540 B2
(45) Date of Patent: Jan. 24, 2006

(54) METHOD AND DEVICE FOR TRANSMITTING INFORMATION ON A BUS SYSTEM, AND A BUS SYSTEM IN WHICH DIFFERENT INFORMATION IS UNIQUELY ASSIGNED DIFFERENT INFORMATION IDENTIFIERS

(75) Inventors: Lambros Dalakuras, Birkenfeld (DE); Andreas Boehm, Dettingen/Teck (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 10/256,790

(22) Filed: Sep. 26, 2002

(65) Prior Publication Data

US 2003/0070019 A1  Apr. 10, 2003

(30) Foreign Application Priority Data

Sep. 26, 2001 (DE) ................................ 101 47 445

(51) Int. Cl.
  G06F 13/38 (2006.01)
  H04J 3/24 (2006.01)
(52) U.S. Cl. ...................... 710/110; 709/208; 370/349
(58) Field of Classification Search ................ 710/110, 710/100, 305; 709/201–208, 248; 340/825.2, 340/825.21, 825.52; 370/438, 465, 349, 370/342, 395.52, 395.53, 908; 375/354
See application file for complete search history.

(56) References Cited

U.S. PATENT DOCUMENTS

| | | | | |
|---|---|---|---|---|
| 4,935,869 A | * | 6/1990 | Yamamoto | .................. 707/202 |
| 5,686,898 A | * | 11/1997 | Willard et al. | ................ 340/2.8 |
| 5,987,376 A | * | 11/1999 | Olson et al. | ................. 701/201 |
| 6,311,209 B1 | * | 10/2001 | Olson et al. | ................. 709/204 |

OTHER PUBLICATIONS

"New acoustic systems for AUV tracking, communications, and noise measurement at NSWCCD-ARD, Lake Pend Oreille, Idaho" by Odell, D.; Hertel, K.; Nielen, C. (abstract only) Publication date Oct. 29-31, 2002.*

* cited by examiner

*Primary Examiner*—Gopal C. Ray
(74) *Attorney, Agent, or Firm*—Kenyon & Kenyon

(57) ABSTRACT

A method and device is described for transmitting information on a bus system having at least two users, as well as a bus system, exactly one superordinate user (master) and at least one subordinate user (slave) being provided, and the information being transmitted in a definable, closed message frame which, in addition to the information to be transmitted, also contains synchronization information, different information being uniquely assigned different information identifiers; after each closed message frame, a number of information sections being provided in which the at least one subordinate user may enter information.

12 Claims, 2 Drawing Sheets

METHOD AND DEVICE FOR TRANSMITTING INFORMATION ON A BUS SYSTEM, AND A BUS SYSTEM IN WHICH DIFFERENT INFORMATION IS UNIQUELY ASSIGNED DIFFERENT INFORMATION IDENTIFIERS

FIELD OF THE INVENTION

The present invention relates to a method and a device for transmitting information on a bus system, and a bus system that has at least two users, exactly one superordinate user (a so-called master) and at least one subordinate user (a so-called slave).

BACKGROUND INFORMATION

The networking of control units, sensors and actuators with the aid of a communication system, that is, a bus system, has increased in recent years in the construction of modern motor vehicles and in machine construction, for example in the field of machine tools and in automation. In this context, synergy effects due to the distribution of functions to several control units or other users may be achieved. These are referred to as distributed systems. The communication between different users of such distributed systems may occur more and more via a bus or a bus system. The communication traffic on the bus system, access and reception mechanisms, as well as error recoveries may be governed via a protocol.

A bus system of this type having a corresponding protocol is the LIN bus (Local Interconnect Network). The LIN bus is a master-slave bus whose users are connected via a logic bus line. A maximum of one master and up to 64 slaves belong to each bus. An unshielded physical single-wire line is used as the transmission medium. The LIN protocol divides the transmitting and receiving process into two tasks. The master task deals with synchronization and addressing, and the slave task deals with the data. A master is able to execute both the master task and the slave task, while a slave is able to execute only the slave task. A slave-to-slave data exchange may be performed via special addressing. In this context, each data transfer is made up of a messaging or communications frame in which both the synchronization and the data information are transmitted. The individual sections of the message, the so-called byte fields, have the same format of a serial interface in the case of 8N1 transmission, i.e. 8 data bits and 1 stop bit. At the beginning of each message frame, the master sends synchronization information, the so-called SynchBreak, in order to recover slaves from a possible idle state and enable synchronization. The SynchField follows the SynchBreak. In this case, the master sends a hexadecimal pattern to enable the slave to be synchronized, for example with the aid of trailing edges, recessive toward dominant. The next information identifier or identifier field (IdentField) provides information about the content and the length of the subsequent data fields and hence of the message frame.

Single-wire bus systems of this type, like the LIN bus, may be used with greater frequency today for cost reasons in sub-bus systems, for example, in motor vehicles. In this case, the bus access for the LIN bus is based on a strict master/slave method, as mentioned. The LIN slaves in this method may not signal a local event to the master. Consequently, depending on the application and data volume, this may result in a high bus load, even with few time-critical signals, due to the time-intensive polling of the slaves, i.e., the time-intensive ascertainment of readiness for receiving or sending.

Thus, it may be shown that the related art, in particular the LIN bus, may not be capable in every respect of supplying optimal results. Therefore, the existing LIN bus may require expansion so that the subordinate users in the bus system, i.e. the slaves, are able to send out information by themselves.

SUMMARY OF THE INVENTION

This objective may be achieved by a method and a device for transmitting information on a bus system, and a corresponding bus system having at least two users; exactly one superordinate user (a so-called master) and at least one subordinate user (a so-called slave) are provided; the information may be transmitted on the bus system in a defined, closed message frame, which, in addition to the information to be transmitted, may also contain synchronization information such as a SynchBreak or SynchField; different information may be uniquely assigned different information identifiers (identifier field), and—following each closed message frame—a number of information sections (information slots, IS) may be provided in which the at least one subordinate user, i.e. slave, may enter information.

In an example embodiment, a sequence or priority may be specified for the information sections, and exactly one information identifier may be assigned to each information section. In other words, exactly one identifier field (IdentField) may be assigned to each information slot (IS). In this case, the information slots may then also be characterized as priority information slots or priority slots.

Moreover, the information identifiers (IdentField) may be uniquely assigned to the users, such as, for example the slaves, generally via the data sent through the slaves, so that exactly one slave may be deduced with each information identifier.

In an example embodiment, the at least one subordinate user, i.e. the slaves, may enter synchronization information of the bus system, for example a SynchBreak, into an information section (information slot, priority slot) assigned to such an information identifier or identifier field of the slave, whereby the superordinate user or master then may initiate a transmission of a message frame having this information section that contains the synchronization information.

In an example embodiment, the number of information sections may correspond to the number of different information identifiers in the bus system. In an example embodiment, the bus system is a LIN bus system. The LIN master may supplement the synchronization information, entered by the at least one slave in at least one information slot or priority slot as SynchBreak, with SynchField, IdentField, corresponding data fields and a ChecksumField to form a complete LIN message frame. A number of information sections or priority slots/information slots may also be provided anew following the closed LIN message frame.

This expansion, for example of the existing LIN specification, may reduce the reaction times on the LIN bus.

Thus, the slaves or subordinate users in a master/slave bus system may signal local events by themselves. The slaves may then accordingly be specifically queried by the master, and they may not have to be sequentially polled. In this manner, local events at the slaves may be detected more rapidly, which may substantially improve bus performance in existing platform configurations such as a DPM design (distribution power module), or with keyless entry.

On the LIN bus, for example, the reaction times may thereby shortened, and the additional bandwidth may offer additional applications to use the cost advantages of a simply structured bus system, such as a LIN bus system.

The proposed expansion by inserting so-called information slots or priority slots may be downwardly compatible with existing bus specifications and may be used therein. This downward compatibility may be available, for example, for LIN bus systems.

As suggested earlier, the additional discussion may refer to, for example, a LIN bus system. However, this is not to be taken as a limitation in the sense that other bus systems with comparable characteristics may not be expanded according to the invention. Thus, the subject matter of the invention, may apply generally to bus systems using a master/slave method, a definable, closed message frame and unique assignment of information to information identifiers, and users to identifiers. This unique assignment of information to information identifiers may, on the one hand, be achieved in that each information source, such as, for example, the slaves, may have a unique identifier, and each may communicate only the assigned information, or, as with LIN or CAN bus systems, the tag may be directly assigned to the data content.

DETAILED DESCRIPTION

Figure 1:
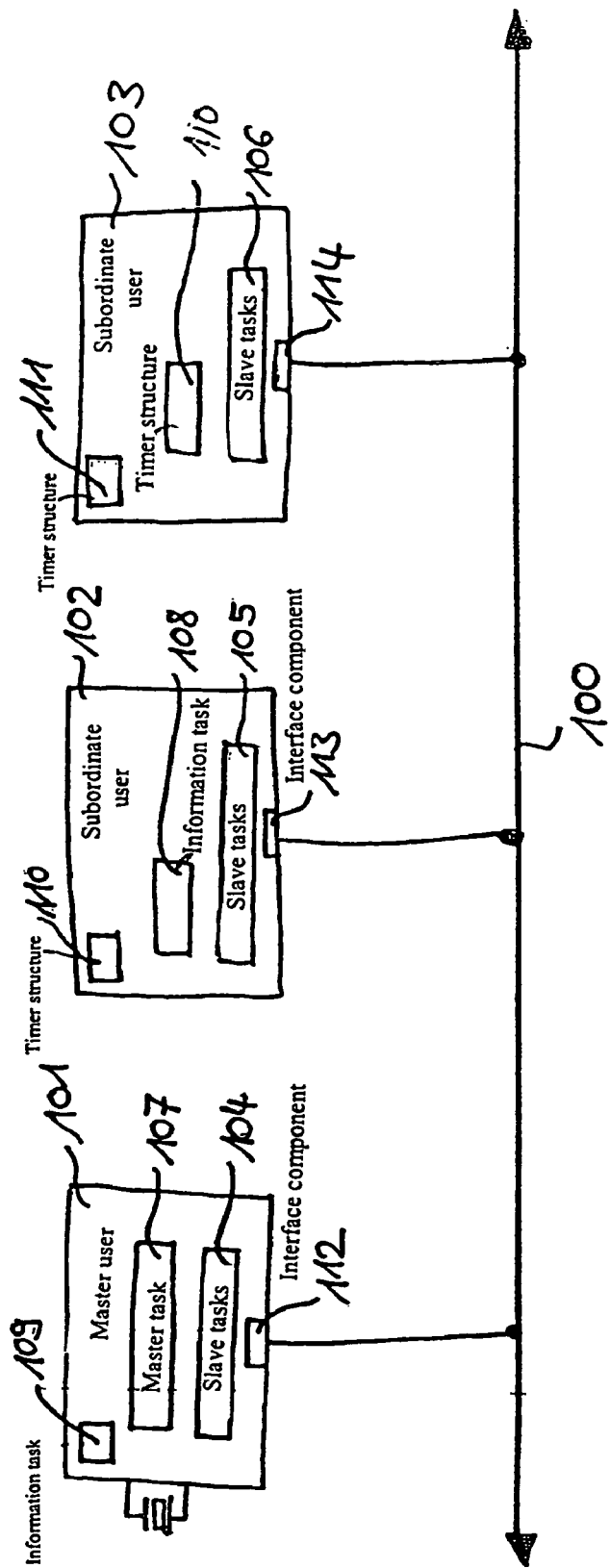
FIG. 1 shows an example bus system for transmitting information via the slaves.

FIG. 1 shows a bus system according to the present invention, specifically a LIN bus system having bus users 101 to 103. These users 101 to 103 are connected to each other via bus line or bus 100. In this context, a superordinate user, or master, is depicted as user 101 in the bus system. Users 102 and 103 represent subordinate users or slaves. As previously mentioned in the background description, the LIN protocol divides the transmission and reception process into two tasks. The master task or header H contains the synchronization and addressing via the fields SynchBreak, SynchField and IdentField, and the slave task or response R includes the data or data field and the checksum field.

In FIG. 1, the slave tasks or the arrangement of the particular bus users 101 to 103 executing them are depicted as 104 to 106. Likewise, the master task, or the arrangement executing it, is represented by block 107, which, for example, may not prevent the same arrangement from executing slave and master tasks in the master. According to the present invention, at slave users 102 and 103 an additional so-called information task, represented by blocks 108 and 109, is now added, by which they are able to enter information in the information slots, or, given consideration of a priority, priority slots, thus the information sections, shown more precisely later in FIG. 2.

Due to the synchronization by master 101, only one physical timer 108 in the master may be required for the bus system, as well. This physical timer may correspond to a quartz, a VCO (voltage controlled oscillator), or something similar. The time adjustment, synchronization, etc. may then be realized using a normal conventional timer structure 110 to 111, depending on the user. In particular, the generation and evaluation of the delay times within the frame of the information sections or information slots/priority slots may then be implemented using conventional timer structures of this type. Alternatively, the delay time may be generated according to the present invention in the slave via an expanded UART (Universal Asynchronous Receiver Transmitter) interface, which allows information, e.g., a SynchBreak, to be sent after a delay under certain conditions. In master 101, an appropriately expanded UART may also facilitate the evaluation of the times. Interface components 112 to 114 are therefore formed by such UART interfaces.

Figure 2:
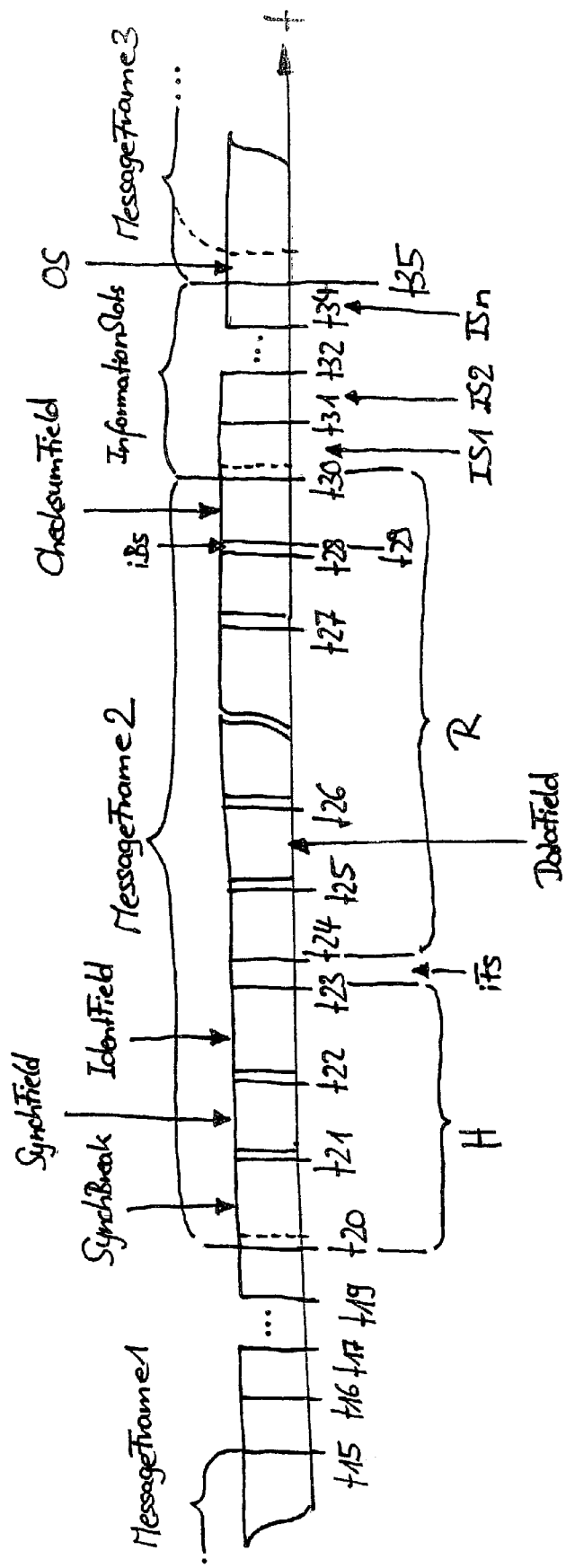
FIG. 2 shows example information sections of the present invention in terms of message frames.

FIG. 2 shows message frames and subsequent information sections (information slots). That is to say, depending on the application, information sections, information slots to be precise, or, if they have a priority, priority slots, are inserted following a message frame. A priority, for example, from 1 to 8 or from 1 to 16 may be assigned to each slave or to a specific slave send message, depending on the identifier field, that is, the information identifier. The information slots then become priority slots.

A data transfer is made of a message frame, in this case message frame 1, message frame 2 and message frame 3, with message frame 1 and message frame 2 being only intimated for the sake of clarity. This message frame (message frame 2 in the example) contains synchronization information, specifically in the so-called master task or header H, from t20 to t23 in this case. At the beginning of each message frame, in this case message frame 2, the master sends SynchBreak or SynchBreakField from t20 to t21 to recover the slaves from a possible idle state and enable synchronization. The SynchBreak is made of two different parts. The first part is a bus-dominant signal, and the second is a bus-recessive signal. Subsequently, an auxiliary pattern such as a hexadecimal pattern like 0X55 is sent from t21 to t22 in the SynchField in order to enable the slave to synchronize, for example, in the case of 0X55, using the five trailing edges, recessive toward dominant.

The synchronization of the special LIN protocol is based on time measurements. In the Synchfield, the master sends the auxiliary pattern just mentioned, for example, 0X55, and the slave measures the time between any two trailing edges. Any space between two trailing edges has exactly the length of two bits. If a measurement is then made from the edge of the start bit to the edge of the seventh bit, and the result is divided by eight, an exact time measurement and, thus, synchronization may be effected.

After the SynchField comes the IdentField or identifier field or also information identifier, from t22 to t23. In this identifier field, as already intimated earlier, the slave address itself or else an identifier for the subsequent information content may be indicated to clearly establish the message or data content by evaluating the identifier field. Likewise, the length of the message or the subsequent data fields is coded in the identifier field so that the data length or the length of the message frame may also be derived from it. As a result, the slaves may be divided, for example, into groups with two, four or eight data fields regarding the data content sent from them.

Following header H is the so-called slave task or response/answer R. There may be a small time space between header H and response R, the so-called in-frame response space, iFs. Likewise, there may be time spaces between the individual fields, for example, between the data fields, which are then labeled iBs (inter-byte space). In the response, data fields are depicted from t24 to t25, from t25 to t26 and from t27 to t28. A data field of this type contains, for example, eight information bits having a start bit and a stop bit. This corresponds exactly to 8N1 transmission. The message frame, in this case message frame 2, is closed here with a checksum field from t29 to t30, allowance having been made here for the iBs (inter-byte space) from t28 to t29. This concluding checksum field that is sent by the slave represents a checksum that is calculated from the previously sent data fields. As mentioned, the checksum field closes the message frame (in this case message frame 2), so that it extends from t20 to t30.

According to the present invention, a time is now reserved after a message frame for the information slots or information sections. These information slots IS1, IS2 to ISn from t30 to t31, t31 to t32 and t34 to t35 are used so that, at the end of each message, the slaves may signal in particular local events by entering information in the corresponding information section. The information sections IS1, IS2 to ISn are either assigned to specific slaves or designated by the identifier field for specific message contents. An information section/slave assignment is achieved in turn by a unique assignment of message contents to specific subordinate users, that is slaves.

Let us assume that information sections IS1, IS2 to ISn are assigned priorities according to their sequence, so that we may refer to priority slots or priority sections in the following. In this manner at the end of each message, the slaves may signal local events by sending, for example, synchronization information, precisely for the LIN bus, a SynchBreak, in the corresponding priority slot. The master detects the SynchBreak and completes the message with the SynchField, IdentField, corresponding data fields and the checksum field. The remaining slaves monitor the bus and do not detect whether the SynchBreak is sent by the master or a slave. If a slave, beginning in a priority slot assigned to it, has entered a SynchBreak in the information slots or the information section, the following information sections having lower priority are no longer implemented, since the Master completes the message frame. This means if the transmission of a SynchBreak is started in IS1, the subsequent IS2 to ISn have no effect, i.e. are overwritten as the message frame is completed. If, for example, the transmission of the SynchBreak is begun in IS2 and the IS1-assigned slave sends no SynchBreak, the information sections are first overwritten starting at IS2. In this manner, the master is also able to measure the time until the SynchBreak is sent and may thereby detect the slave in which an event has occurred. This slave may then be directly queried.

An iBs or iFs, which optionally may or may not be present, is likewise indicated here by dashed lines in the information sections. For reasons of clarity, this is not indicated between the other information sections, but may nonetheless be possible. Likewise, an optional open space OS such as an inter-frame space or a break is shown following the information sections beginning at t35. OS may have a variable length as low as zero. Ideally, with t35, the next message frame 3 directly follows the last information slot, as is also shown in the transition from message frame 1 to message frame 2 with the information sections from t15 to t16, t16 to t17 and t19 to t20.

As already described, the delay times for the information sections may be generated and evaluated using conventional timer structures. Alternatively, the delay time may be generated in the slave via an expanded UART interface which allows information such as the SynchBreak to be sent after a delay under certain conditions. In the master, a correspondingly expanded UART may likewise facilitate the evaluation of the times. In comparison to the polling of the LIN bus, local events may be detected more rapidly, i.e. the reaction times on the LIN bus are substantially shortened by introducing the information sections, or in the priority slots.

In general, the bus may remain recessive in t30, i.e., at the end of the message frame following the last stop bit, e.g. for a bit period (in FIG. 2 indicated by broken lines), to then begin with the first priority slot. Time intervals of this type may also occur between the individual priority slots.

What is claimed is:

1. A method for transmitting information on a bus system having at least two users, comprising:
providing a superordinate user;
providing at least one subordinate user;
transmitting the information including synchronization information in a definable, closed message frame;
uniquely assigning different information identifiers to different information; and
providing a plurality of information sections after each closed message frame for entering information by the at least one subordinate user.

2. The method according to claim 1, further comprising:
specifying a sequence for the information sections; and
assigning one information identifier to each information section.

3. The method according to claim 1, further comprising:
uniquely assigning the information identifiers to the at least two users.

4. The method according to claim 1, further comprising:
uniquely assigning the information identifiers to the at least one subordinate user.

5. The method according to claim 1, further comprising:
entering information of the bus system, by the at least one subordinate user, in an information section assigned to an information identifier; and
initiating a transmission, by the superordinate user, of a message frame having the information section assigned to the information identifier.

6. The method according to claim 5, further comprising:
entering the synchronization information, by the at least one subordinate user, as a SynchBreak in at least one information section;
supplementing the synchronization information, by the superordinate user in a LIN bus system, with a SynchField, an IdentField, corresponding data fields, and a checksumField to form a complete LIN message frame; and
providing a least one new information section following the complete LIN message frame.

7. The method according to claim 1, wherein a number of information sections corresponds to a number of different information identifiers.

8. The method according to claim 1, wherein the bus system includes a LIN bus system.

9. A bus system for transmitting information having at least two users, comprising:
a superordinate user;
at least one subordinate user;
a first arrangement for transmitting the information including synchronization information in a definable, closed message frame;
a second arrangement for uniquely assigning different information identifiers to different information; and
a third arrangement for providing at least one information section after each closed message frame for entering information by the at least one subordinate user.

10. The bus system according to claim 9, wherein the bus system includes a LIN bus system.

11. A device for transmitting information in a bus system having at least two users, comprising:
- a superordinate user;
- at least one subordinate user;
- a first arrangement for transmitting the information including synchronization information in a definable, closed message frame;
- a second arrangement for uniquely assigning different information identifiers to different information; and
- a third arrangement for providing at least one information section after each closed message frame for entering information by the at least one subordinate user.

12. The device according to claim 11, further comprising:
- a UART module for specifying a delay time following a message frame for the at least one information section.

* * * * *